United States Patent
Nakaya

(10) Patent No.: US 12,146,546 B2
(45) Date of Patent: Nov. 19, 2024

(54) ROTARY DAMPER

(71) Applicant: SOMIC MANAGEMENT HOLDINGS INC., Tokyo (JP)

(72) Inventor: Kazumasa Nakaya, Shizuoka (JP)

(73) Assignee: SOMIC MANAGEMENT HOLDINGS INC., Tokyo (JP)

( * ) Notice: Subject to any disclaimer, the term of this patent is extended or adjusted under 35 U.S.C. 154(b) by 135 days.

(21) Appl. No.: 17/997,617

(22) PCT Filed: Apr. 8, 2021

(86) PCT No.: PCT/JP2021/014901
§ 371 (c)(1),
(2) Date: Oct. 31, 2022

(87) PCT Pub. No.: WO2021/235129
PCT Pub. Date: Nov. 25, 2021

(65) Prior Publication Data
US 2023/0265904 A1   Aug. 24, 2023

(30) Foreign Application Priority Data

May 19, 2020   (JP) .............................. 2020-087493

(51) Int. Cl.
*F16F 9/04*   (2006.01)
*F16F 9/14*   (2006.01)

(52) U.S. Cl.
CPC .......... *F16F 9/145* (2013.01); *F16F 2232/02* (2013.01)

(58) Field of Classification Search
USPC ........................................................ 188/290
See application file for complete search history.

(56) References Cited

U.S. PATENT DOCUMENTS

2009/0193617 A1   8/2009   Yamamoto et al.

FOREIGN PATENT DOCUMENTS

| JP | H02-121645 U | 10/1990 |
| JP | H03-111395 A | 5/1991 |

(Continued)

OTHER PUBLICATIONS

International Search Report mailed on Jun. 8, 2021 for PCT/JP2021/014901.

*Primary Examiner* — Melanie Torres Williams
(74) *Attorney, Agent, or Firm* — Pearne & Gordon LLP

(57) ABSTRACT

Provided is a rotary damper configured so that specifications can be easily changed and favorable economic performance can be provided by continuous use of a typical rotary damper. The rotary damper (100) includes a housing (101) and a turning characteristic defining unit (140). The housing (101) has an inner chamber (103) housing a movable vane (132) of a rotor (130) and fluid (170). The housing body (102) has first externally-communicable paths (110) to (113) and second externally-communicable paths (114) to (116) communicating with an outer surface of the housing body (102). The turning characteristic defining unit (140) has, in a unit body (141), turning characteristic definers (160) to (163) defining turning characteristics of the rotor (130) and first definer communication paths (150) to (153) and second definer communication paths (154) to (156) causing the turning characteristic definers (160) to (163) and an outer surface of the unit body (141) to communicate with each other.

8 Claims, 12 Drawing Sheets

(56) References Cited

FOREIGN PATENT DOCUMENTS

| JP | H05-280568 | A |   | 10/1993 |
|----|------------|---|---|---------|
| JP | H0972368   | A | * | 3/1997  |
| JP | H10-122287 | A |   | 5/1998  |
| JP | H11-082593 | A |   | 3/1999  |
| JP | 2000120751 | A | * | 4/2000  |
| JP | 3778668    | B2| * | 5/2006  |
| JP | 2007-321961| A |   | 12/2007 |

* cited by examiner (A)

(B)

(C)

(D)

ROTARY DAMPER

TECHNICAL FIELD

The present invention relates to a rotary damper used as a kinetic energy damping device in a turning mechanism in a four- or two-wheeled self-propelled vehicle or industrial equipment.

BACKGROUND ART

Typically, in a four- or two-wheeled self-propelled vehicle or industrial equipment, a rotary damper as a kinetic energy damping device is used in a turning mechanism. For example, Patent Literature 1 below discloses a rotary damper. In this rotary damper, the inside of a housing is divided into four operation chambers by two partition walls provided in the housing and two vanes provided in a blade shape at a shaft turning in the housing.

CITATION LIST

Patent Literature

PATENT LITERATURE 1: JP-A-11-82593

SUMMARY OF INVENTION

However, in the rotary damper disclosed in Patent Literature 1 above, there are the following problems. That is, in the case of changing turning characteristic specifications of the rotary damper, such as damping characteristics, characteristics of compensation for a temperature change, and pressure resistance characteristics, a rotary damper having desired specifications needs to be newly prepared. For this reason, it is difficult to change the specifications of the rotary damper and a typical rotary damper cannot be used, leading to unfavorable economic performance.

The present invention has been made to cope with the above-described problems. An object of the present invention is to provide the following rotary damper. In this rotary damper, specifications can be easily changed. Further, the typical rotary damper can be continuously used, leading to favorable economic performance.

In order to achieve the above object, as a feature of the present invention, a rotary damper includes: a housing having a cylindrical inner chamber housing fluid in a liquid-tight manner and having a fixed vane formed in a wall shape along a radial direction in the inner chamber and blocking a flow of the fluid in a circumferential direction; a rotor having, at an outer peripheral portion of a shaft, a movable vane dividing an inside of the inner chamber and turning while pressing the fluid to a fixed vane side; at least two cells formed by the fixed vane and the movable vane in the inner chamber and having volumes increasing or decreasing according to a rotation direction of the movable vane; a turning characteristic definer defining a turning characteristic of the rotor by use of the fluid; and a turning characteristic defining unit provided outside the housing and having the turning characteristic definer and a first definer communication path causing the fluid to flow to or from the turning characteristic definer. The housing has a first externally-communicable path extending from at least one of the at least two cells and opened at an outer surface of the housing such that the fluid flows in the first externally-communicable path. In the turning characteristic defining unit, the first definer communication path is detachably connected to the first externally-communicable path.

According to the feature of the present invention configured as described above, in the rotary damper, the first definer communication path in the turning characteristic defining unit including the turning characteristic definer is detachably connected to the first externally-communicable path connected to the inner chamber in the housing. Thus, the turning characteristic specifications can be easily changed by replacement with a turning characteristic defining unit having a desired turning characteristic definer. Further, a component of the typical rotary damper, such as a housing, can be continuously used, leading to favorable economic performance. Moreover, in the rotary damper according to the present invention, a turning characteristic definer having such a size that the turning characteristic definer cannot be provided in the housing can be easily provided.

The turning characteristics of the rotor as described herein include, for example, the direction of turning of the rotor, torque damping characteristics, characteristics of compensation for a volume change in the fluid due to a temperature change in the fluid, and characteristics of permissibility of turning of the rotor itself. Thus, the turning characteristic definer includes, for example, various valves such as a one-way valve, a throttle valve, a relief valve, and a linear solenoid valve and an accumulator.

Moreover, as another feature of the present invention, in the rotary damper, the turning characteristic defining unit is detachable from the housing.

According to another feature of the present invention configured as described above, in the rotary damper, the turning characteristic defining unit is detachable from the housing. Thus, the turning characteristics of the rotor can be easily changed. Further, the component of the typical rotary damper, such as the housing, can be continuously used, leading to favorable economic performance.

Moreover, as another feature of the present invention, in the rotary damper, the housing has a housing-side coupling portion formed in a flat planar shape at part of the outer surface, and the first externally-communicable path is opened at the housing-side coupling portion. The turning characteristic defining unit has a unit-side coupling portion formed in a flat planar shape at part of an outer surface and arranged facing the housing-side coupling portion, and the first definer communication path is opened at the unit-side coupling portion.

According to another feature of the present invention configured as described above, in the rotary damper, the housing-side coupling portion and the unit-side coupling portion as connection surfaces of the housing and the turning characteristic defining unit are formed in the flat planar shape. Thus, each coupling portion can be easily produced in a liquid-tight manner. Further, liquid tightness at a connection portion can be easily maintained, and maintenance can be easily performed.

Moreover, as another feature of the present invention, in the rotary damper, the turning characteristic defining unit is provided at a position physically apart from the housing.

According to another feature of the present invention configured as described above, in the rotary damper, the turning characteristic defining unit is provided at the position physically apart from the housing. Thus, the housing can be placed in a narrow space, or the housing or the turning characteristic defining unit can be placed at a location where maintenance can be easily performed. Thus, variations in installation of the rotary damper can be increased.

Moreover, as another feature of the present invention, in the rotary damper, the housing has a second externally-communicable path extending from another one of the at least two cells and opened at the outer surface of the housing such that the fluid flows in the second externally-communicable path. The turning characteristic defining unit has a second definer communication path causing the fluid to flow to or from the turning characteristic definer, and the second definer communication path is detachably connected to the second externally-communicable path.

According to another feature of the present invention configured as described above, in the rotary damper, the housing includes the second externally-communicable path extending from the other one of the at least two cells, and the turning characteristic defining unit includes the second definer communication path. Thus, the turning characteristics can be changed using the fluid flowing between the two cells, and therefore, variations in a turning characteristic change can be increased.

Moreover, as another feature of the present invention, in the rotary damper, the turning characteristic defining unit has multiple turning characteristic definers, and has multiple first definer communication paths respectively corresponding to the multiple turning characteristic definers. In the housing, the first externally-communicable path is formed for each of the multiple first definer communication paths.

According to another feature of the present invention configured as described above, in the rotary damper, the turning characteristic defining unit has the multiple turning characteristic definers and the multiple first definer communication paths. Further, the housing has the first externally-communicable path for each of the multiple first definer communication paths. Thus, a wide variety of turning characteristic specifications can be created. Note that in this case, the multiple turning characteristic definers may be for changing the same type of turning characteristic, or may be for changing different types of turning characteristics.

Moreover, as another feature of the present invention, in the rotary damper, in the turning characteristic defining unit, the multiple turning characteristic definers are provided along an axis direction of the inner chamber.

According to another feature of the present invention configured as described above, in the rotary damper, the multiple types of turning characteristic definers in the turning characteristic defining unit are provided along the axis direction of the inner chamber. Thus, the multiple turning characteristic definers can be efficiently arranged, and a size increase in the configuration can be restrained.

DESCRIPTION OF EMBODIMENTS

Figure 1:
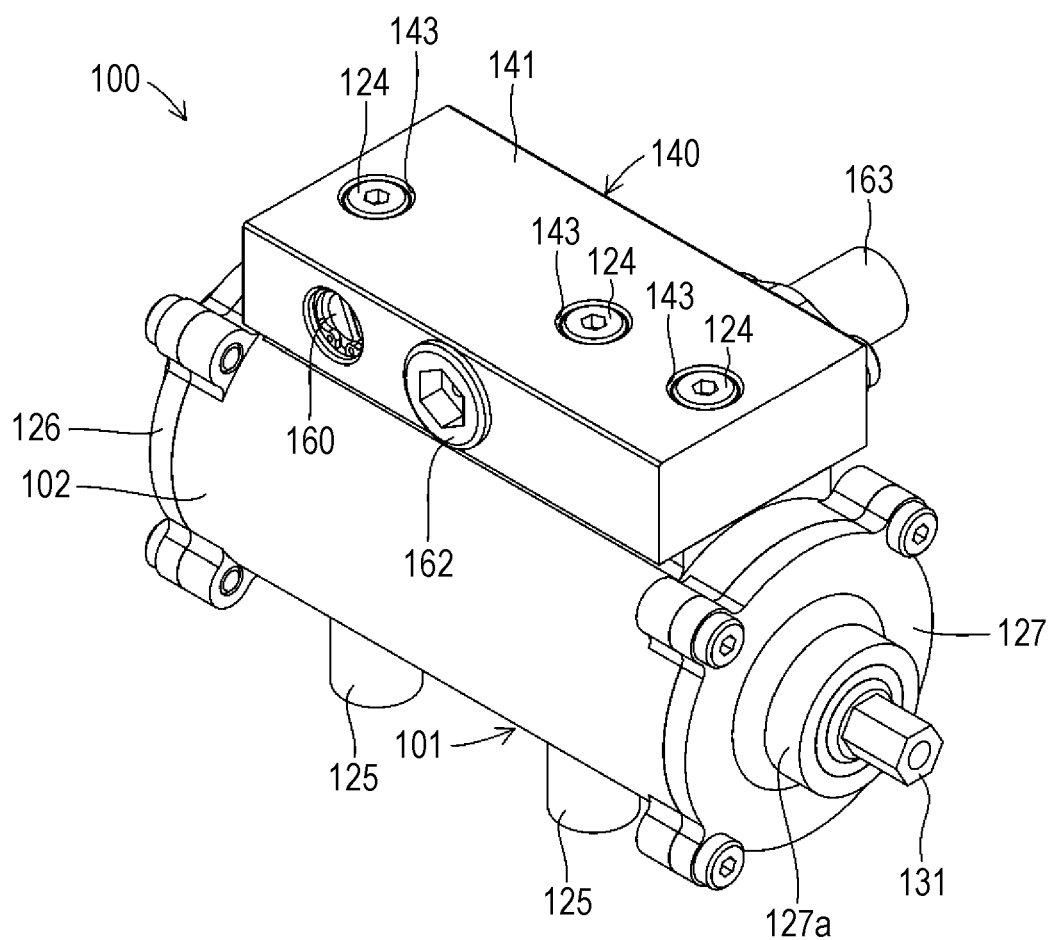
FIG. 1 is a perspective view schematically showing an entire configuration of a rotary damper according to the present invention.
Figure 2:
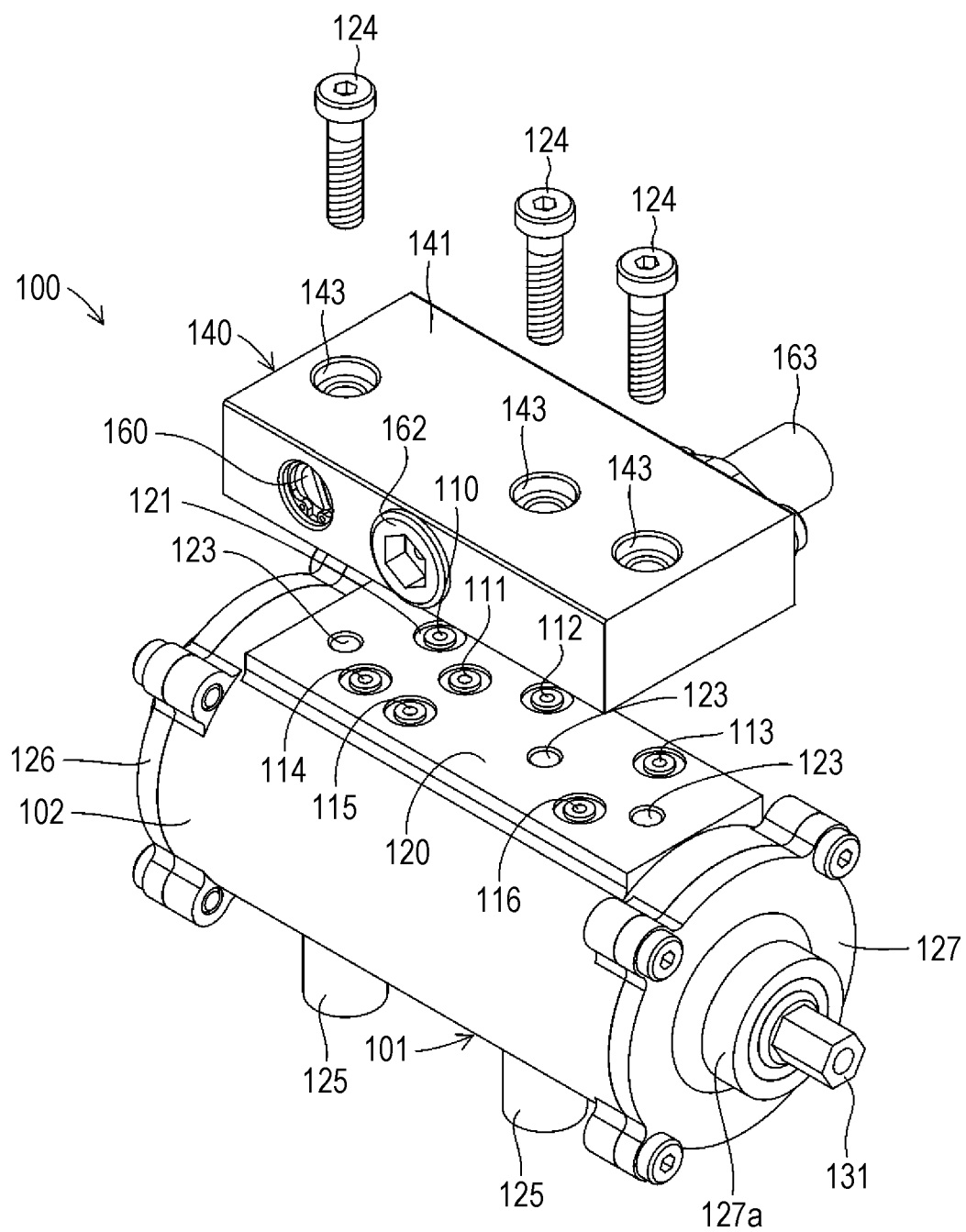
FIG. 2 is an exploded perspective view showing the rotary damper shown in FIG. 1 with a turning characteristic defining unit disassembled from a housing.
Figure 3:
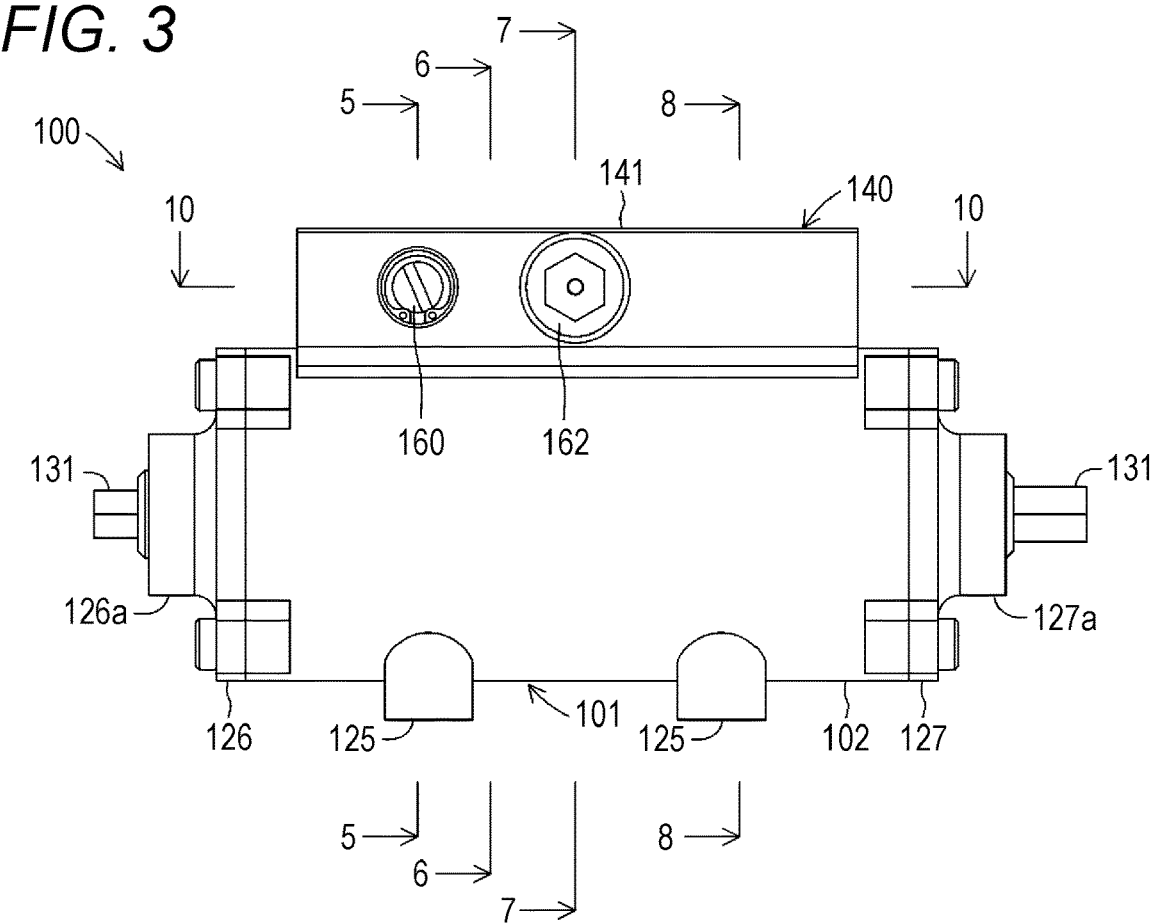
FIG. 3 is a side view showing the outline of an external configuration of the rotary damper shown in FIG. 1.
Figure 4:
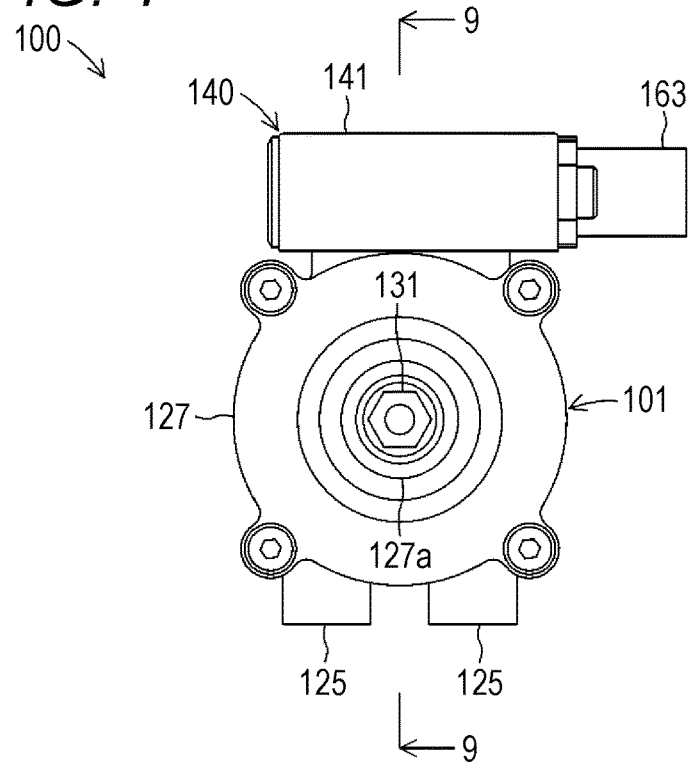
FIG. 4 is a back view showing the outline of the external configuration of the rotary damper shown in FIG. 1.
Figure 5:
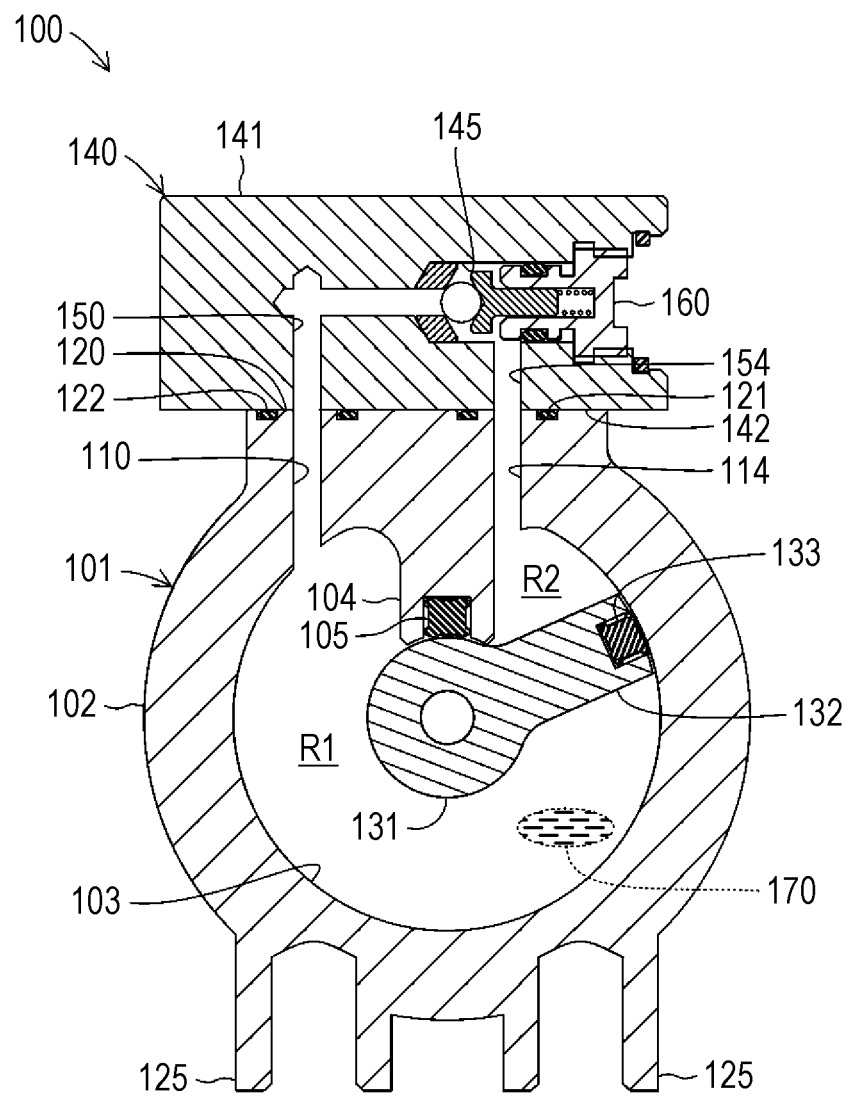
FIG. 5 is a sectional view showing the outline of an internal structure of the rotary damper along a 5-5 line of FIG. 3.
Figure 6:
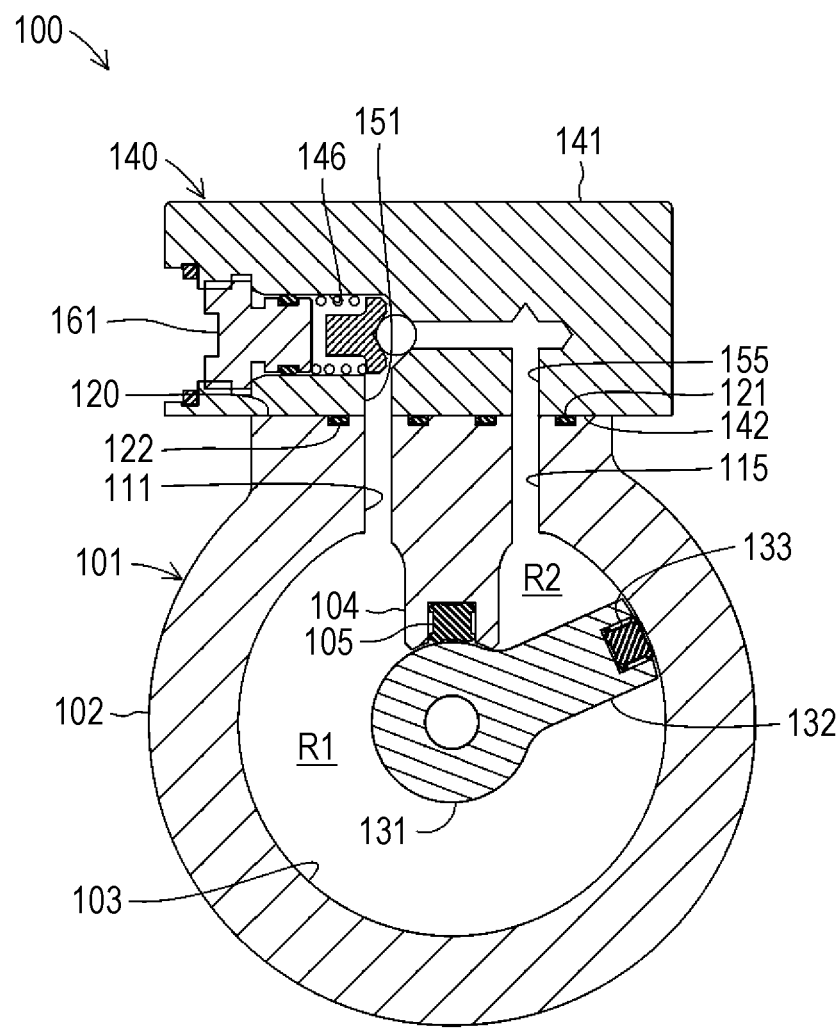
FIG. 6 is a sectional view showing the outline of the internal structure of the rotary damper along a 6-6 line of FIG. 3.
Figure 7:
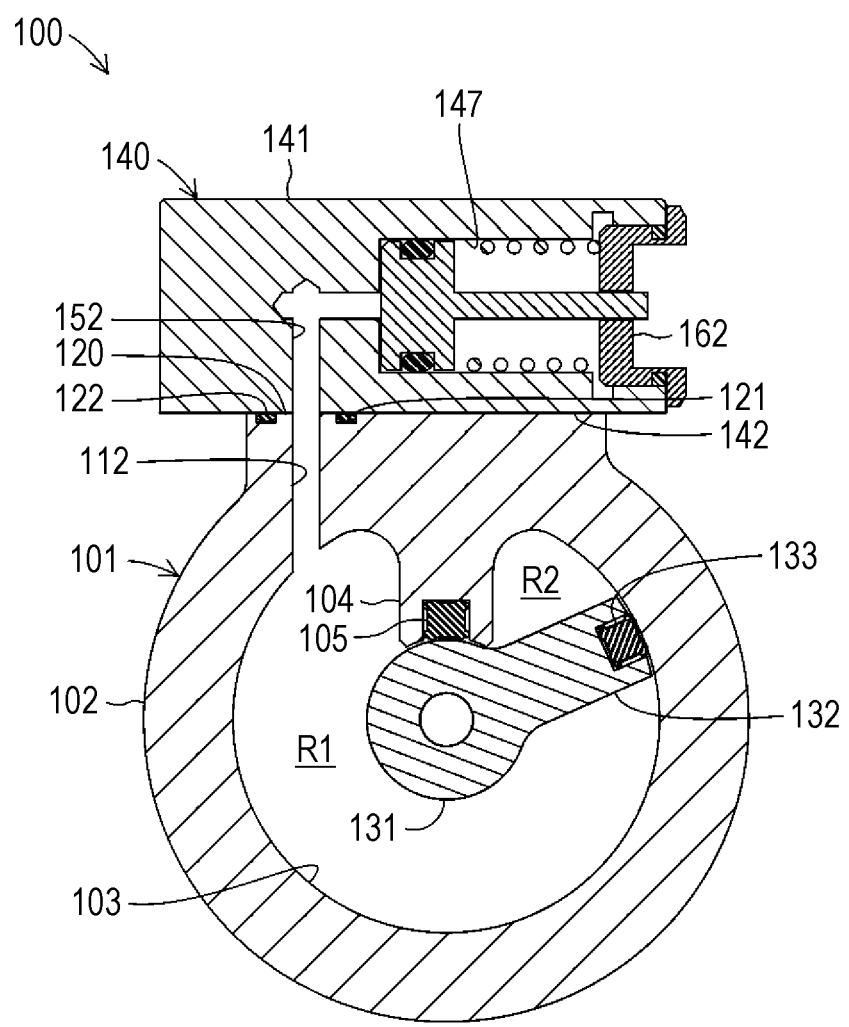
FIG. 7 is a sectional view showing the outline of the internal structure of the rotary damper along a 7-7 line of FIG. 3.
Figure 8:
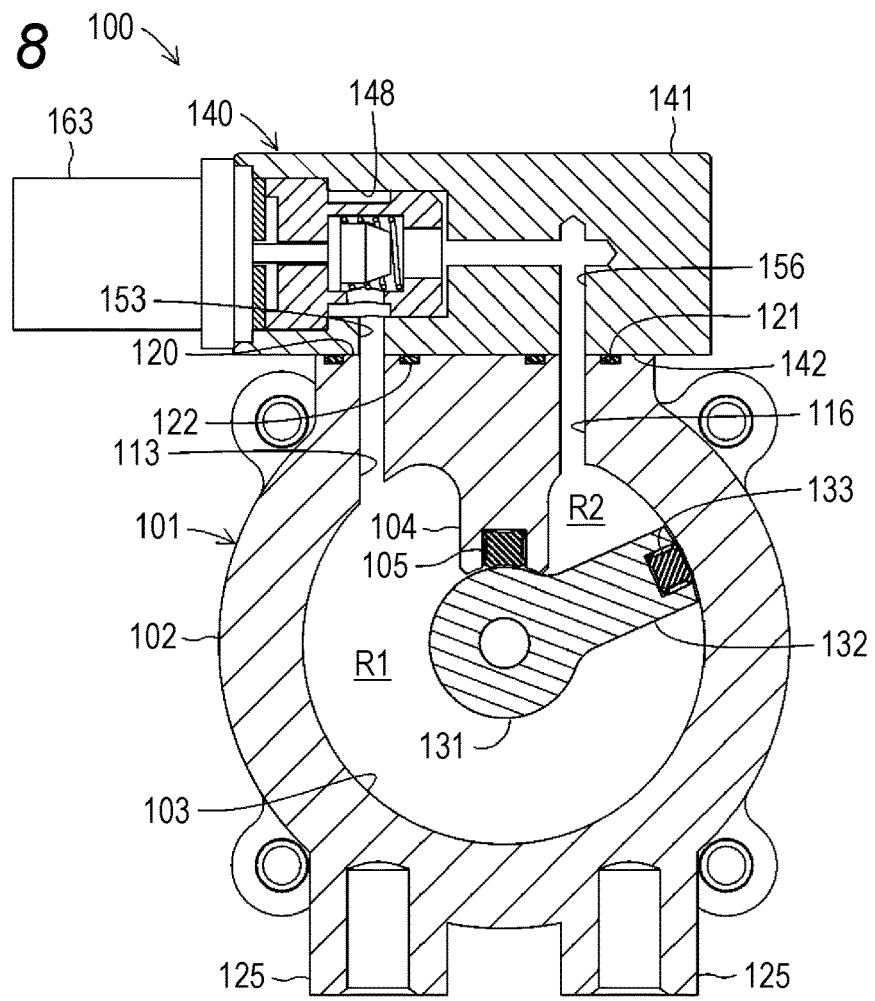
FIG. 8 is a sectional view showing the outline of the internal structure of the rotary damper along an 8-8 line of FIG. 3.
Figure 9:
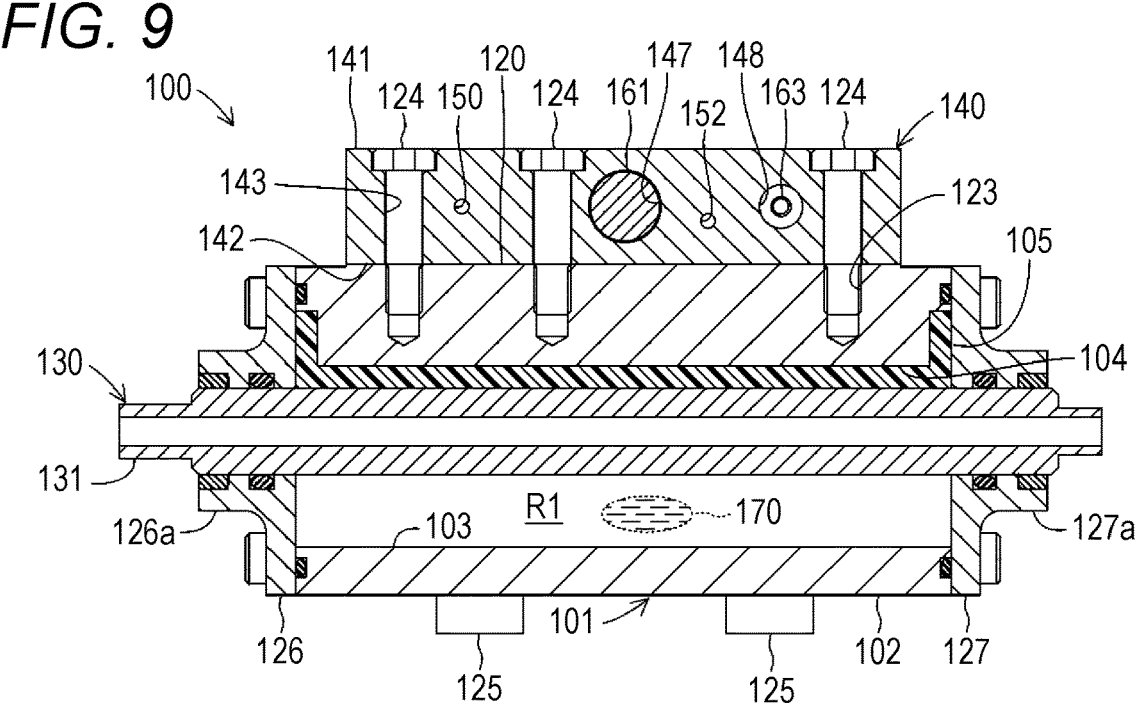
FIG. 9 is a sectional view showing the outline of the internal structure of the rotary damper along a 9-9 line of FIG. 4.

Hereinafter, an embodiment of a rotary damper according to the present invention will be described with reference to the drawings. FIG. 1 is a perspective view schematically showing an entire configuration of the rotary damper 100. Moreover, FIG. 2 is an exploded perspective view showing the rotary damper 100 shown in FIG. 1 with a turning characteristic defining unit 140 disassembled from a housing 101. Further, FIG. 3 is a side view showing the outline of an external configuration of the rotary damper 100 shown in FIG. 1. In addition, FIG. 4 is a back view showing the outline of the external configuration of the rotary damper 100 shown in FIG. 1.

Note that each figure to be referred in the present specification includes schematically-shown portions for the sake of easy understanding of the present invention, and for example, some components are exaggeratedly shown. Thus, the dimensions of each component, the ratios among the components, and the like may vary. The rotary damper 100 is a damping device that generates damping force only in one of two clockwise and counterclockwise rotation directions of a shaft 131. The rotary damper 100 may be, for example, attached to a hinge-side portion of a door (not shown), thereby functioning as a door closer.

(Configuration of Rotary Damper 100)

The rotary damper 100 includes the housing 101. The housing 101 is a component rotatably holding a rotor 130 and forming a casing of the rotary damper 100. The housing 101 is made of an aluminum material, an iron material, a zinc material, or various resin materials such as polyamide resin. Specifically, the housing 101 mainly includes one housing body 102 and two lids 126, 127.

The housing body 102 is a component which houses each of a movable vane 132 of the rotor 130 and fluid 170 as described later and to which the turning characteristic defining unit 140 is to be attached. The housing body 102 is formed in a cylindrical shape. More specifically, each of an inner chamber 103 and a fixed vane 104 is formed inside the housing body 102, and each of a housing-side coupling portion 120 and fixing portions 125 is formed outside the housing body 102.

As shown in each of FIGS. 5 to 9, the inner chamber 103 is a space where the movable vane 132 of the rotor 130 is housed and the fluid 170 is housed in a liquid-tight manner. The inner chamber 103 is formed as a substantially cylindrical space penetrating the housing body 102 in an axis direction thereof. The fixed vane 104 is formed in the inner chamber 103, and each of four first externally-communicable paths 110, 111, 112, 113 and three second externally-communicable paths 114, 115, 116 is opened to the inner chamber 103.

The fixed vane 104 is a wall-shaped portion dividing, together with the rotor 130, the inside of the inner chamber 103 into a cell R1 and a cell R2. The fixed vane 104 is formed so as to project in a raised shape inwardly from an inner wall surface of the inner chamber 103 along the axis direction of the housing body 102. That is, the fixed vane 104 is formed integrally with the housing body 102. Of the fixed vane 104, each of three outer edge portions facing the two lids 126, 127 and the shaft 131 of the rotor 130 is formed in a recessed groove shape. A seal body 105 is fitted in each of these grooves.

The seal body 105 is a component for ensuring liquid tightness between the cell R1 and the cell R2 formed in the inner chamber 103. The seal body 105 is formed in such a manner that an elastic material such as various rubber materials including nitrile rubber, hydrogenated nitrile rubber, and fluorine-containing rubber is formed into a C-shape as viewed from the side. The seal body 105 is attached so as to project from the outer edge portion of the fixed vane 104 and slidably closely contact a corresponding one of inner surfaces of the lids 126, 127 and an outer peripheral surface of the shaft 131 of the rotor 130.

The four first externally-communicable paths 110, 111, 112, 113 are paths causing the cell R1 as one of the cells R1, R2 forming the inner chamber 103 and an outer surface of the housing body 102 facing the outside to communicate with each other such that the fluid 170 flows therebetween. That is, one end portion of each of the first externally-communicable paths 110, 111, 112, 113 is opened at an inner peripheral surface of the inner chamber 103 in the cell R1, and the other end portion is opened at the housing-side coupling portion 120. In this case, the four first externally-communicable paths 110, 111, 112, 113 are formed next to each other along an axis direction of the inner chamber 103.

The first externally-communicable path 110 described herein is a path causing the fluid 170 to flow between the cell R1 and a turning characteristic definer 160. The first externally-communicable path 111 is a path causing the fluid 170 to flow between the cell R1 and a turning characteristic definer 161. The first externally-communicable path 112 is a path causing the fluid 170 to flow between the cell R1 and a turning characteristic definer 162. The first externally-communicable path 113 is a path causing the fluid 170 to flow between the cell R1 and a turning characteristic definer 163.

The three second externally-communicable paths 114, 115, 116 are paths causing the cell R2 as the other one of the cells R1, R2 forming the inner chamber 103 and the outer surface of the housing body 102 facing the outside to communicate with each other such that the fluid 170 flows therebetween. That is, one end portion of each of the second externally-communicable paths 114, 115, 116 is opened at an inner peripheral surface of the inner chamber 103 in the cell R2, and the other end portion is opened at the housing-side coupling portion 120. In this case, the three second externally-communicable paths 114, 115, 116 are formed next to each other along the axis direction of the inner chamber 103.

The second externally-communicable path 114 described herein is a path causing the fluid 170 to flow between the cell R2 and the turning characteristic definer 160. The second externally-communicable path 115 is a path causing the fluid 170 to flow between the cell R2 and the turning characteristic definer 161. The second externally-communicable path 116 is a path causing the fluid 170 to flow between the cell R2 and the turning characteristic definer 163.

The housing-side coupling portion 120 is a portion to which the turning characteristic defining unit 140 is to be detachably attached. The housing-side coupling portion 120 is formed in a flat planar shape on an outer peripheral surface of the housing body 102. In the present embodiment, the housing-side coupling portion 120 is formed, as viewed in plane, in a rectangular shape extending along an axis direction of the housing 101. At the housing-side coupling portion 120, each of the other end portions of the first externally-communicable paths 110, 111, 112, 113 and the second externally-communicable paths 114, 115, 116 is opened.

In this case, a ring-shaped recessed portion 121 recessed in a ring shape is, at the housing-side coupling portion 120, formed outside each opening of the first externally-communicable paths 110, 111, 112, 113 and the second externally-communicable paths 114, 115, 116. A seal member 122 such as an O-ring is fitted in each of these ring-shaped recessed portions 121. Note that the seal members 122 are not shown in FIG. 2.

Each of three attachment holes 123 is formed at the housing-side coupling portion 120. These attachment holes 123 are portions for attaching the turning characteristic defining unit 140. These attachment holes 123 are formed as bottomed cylindrical holes having internal threads into which bolts 124 are to be screwed. These attachment holes 123 are formed next to each other along the axis direction of the housing body 102.

The fixing portions 125 are portions for attaching the rotary damper 100 to an attachment target (not shown) for the rotary damper 100. The fixing portions 125 include four cylindrical bodies projecting downwardly as viewed in the figure from the outer peripheral surface of the housing body 102 on the side (the lower side as viewed in the figure) opposite to the housing-side coupling portion 120. In this case, an internal thread into which a bolt (not shown) used for attachment to the attachment target is to be screwed is formed at an inner peripheral surface of each fixing portion 125.

The two lids 126, 127 are components for closing openings of both end portions of the housing body 102 and supporting the rotor 130. The two lids 126, 127 are formed in such a flat ring shape that outer peripheral portions of rotor support portions 126a, 127a formed in a cylindrical shape project in a flange shape. The rotor support portions 126a, 127a are portions rotatably supporting both end portions of the shaft 131 of the rotor 130. The rotor support portions 126a, 127a support the shaft 131 of the rotor 130 in a liquid-tight manner through seal members, such as rubber seals, provided at inner peripheral portions. These lids 126, 127 are attached to both end portions of the housing body 102 through bolts.

The rotor 130 is a component arranged in the inner chamber 103 of the housing 101 to divide the inside of the inner chamber 103 into two spaces, i.e., the cell R1 and the cell R2. Further, the rotor 130 is a component turned in the inner chamber 103 to increase or decrease the volume of each of the cell R1 and the cell R2. The rotor 130 mainly includes the shaft 131 and the movable vane 132.

The shaft 131 is a cylindrical portion supporting the movable vane 132. The shaft 131 is made of an aluminum material, an iron material, a zinc material, or various resin materials such as polyamide resin. Both end portions of the shaft 131 are slidably supported by the rotor support portions 126a, 127a.

The movable vane 132 is a component dividing the inside of the inner chamber 103 into the multiple spaces and increasing or decreasing the volume of each of these spaces in a liquid-tight manner. The movable vane 132 includes a plate-shaped body extending in a radial direction of the shaft 131 (the inner chamber 103). Of the movable vane 132, each of three outer edge portions facing the two lids 126, 127 and the inner peripheral surface of the inner chamber 103 is formed in a recessed groove shape. A seal body 133 is, as in the seal body 105, fitted in each of these grooves.

With this configuration, the movable vane 132 forms, in cooperation with the fixed vane 104, two spaces, i.e., the cell R1 and the cell R2, in a liquid-tight manner in the inner chamber 103. That is, in the inner chamber 103, the cell R1 and the cell R2 are formed adjacent to each other along a circumferential direction through each of the movable vane 132 and the fixed vane 104.

The turning characteristic defining unit 140 is an instrument for defining turning characteristics of the rotor 130. The turning characteristic defining unit 140 mainly includes each of a unit body 141 and the turning characteristic definers 160, 161, 162, 163. The unit body 141 is a component holding each of the turning characteristic definers 160, 161, 162, 163 and formed with a unit-side coupling portion 142. The unit body 141 is formed in such a manner that an aluminum material, an iron material, a zinc material, or various resin materials such as polyamide resin is/are formed into a block shape. In the present embodiment, the unit body 141 is formed, as viewed in plane, in a rectangular shape extending along the axis direction of the housing 101.

The unit-side coupling portion 142 is formed outside the unit body 141, and each of three attachment holes 143, four definer housing portions 145, 146, 147, 148, four first definer communication paths 150, 151, 152, 153, and three second definer communication paths 154, 155, 156 is formed inside the unit body 141.

The unit-side coupling portion 142 is a portion to be detachably attached to the housing-side coupling portion 120. The unit-side coupling portion 142 is formed in a flat planar shape on an outer peripheral surface of the unit body 141. In the present embodiment, the unit-side coupling portion 142 is formed, as viewed in plane, in a rectangular shape extending along a longitudinal direction of the unit body 141. At the unit-side coupling portion 142, each of the other end portions of the four first definer communication paths 150, 151, 152, 153 and the three second definer communication paths 154, 155, 156 is opened. Moreover, each of the three attachment holes 143 is opened at the unit-side coupling portion 142.

The three attachment holes 143 are portions through which the bolts 124 screwed into the attachment holes 123 penetrate when the turning characteristic defining unit 140 is attached to the housing-side coupling portion 120 of the housing 101. These attachment holes 143 are formed as through-holes penetrating the unit body 141 in the up-down direction as viewed in the figure. These attachment holes 143 are formed next to each other along the longitudinal direction of the unit body 141.

Figure 10:
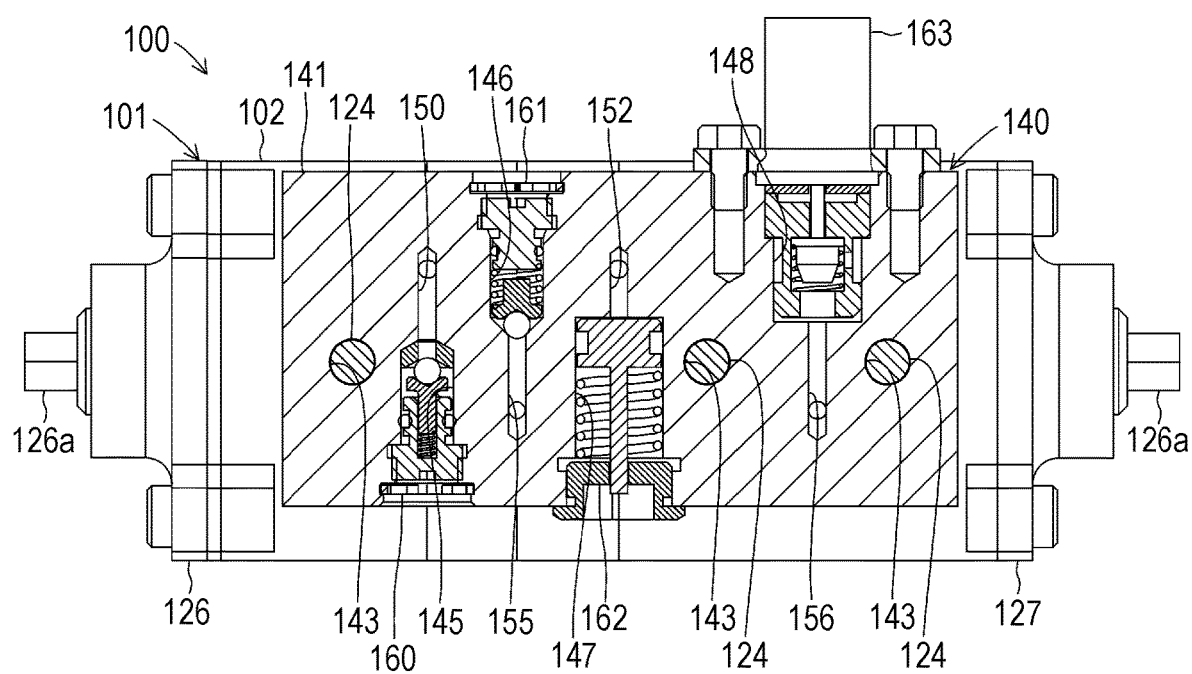
FIG. 10 is a sectional view showing the outline of the internal structure of the rotary damper along a 10-10 line of FIG. 3.

As shown in FIG. 10, the four definer housing portions 145, 146, 147, 148 are portions detachably holding the four turning characteristic definers 160, 161, 162, 163. These definer housing portions 145, 146, 147, 148 are formed in a horizontally-long hole shape opened at side surfaces of the unit body 141. These definer housing portions 145, 146, 147, 148 are formed next to each other along the longitudinal direction of the unit body 141.

The four first definer communication paths 150, 151, 152, 153 are paths causing the turning characteristic definers 160, 161, 162, 163 held in the definer housing portions 145, 146, 147, 148 and an outer surface of the unit body 141 facing the outside to communicate with each other such that the fluid 170 flows therebetween. That is, one end portion of each of the first definer communication paths 150, 151, 152, 153 is opened to a corresponding one of the definer housing portions 145, 146, 147, 148, and the other end portion is opened at the unit-side coupling portion 142. In this case, the four first definer communication paths 150, 151, 152, 153 are formed next to each other along the longitudinal direction of the unit body 141.

The first definer communication path 150 described herein is a path connected to the first externally-communicable path 110 and causing the fluid 170 to flow between the first externally-communicable path 110 and the turning characteristic definer 160. The first definer communication path 151 is a path connected to the first externally-communicable path 111 and causing the fluid 170 to flow between the first externally-communicable path 111 and the turning characteristic definer 161. The first definer communication path 152 is a path connected to the first externally-communicable path 112 and causing the fluid 170 to flow between the first externally-communicable path 112 and the turning characteristic definer 162. The first definer communication path 153 is a path connected to the first externally-communicable path 113 and causing the fluid 170 to flow between the first externally-communicable path 113 and the turning characteristic definer 163.

The three second definer communication paths 154, 155, 156 are paths, in addition to the three first definer communication paths 150, 151, 153, causing the turning characteristic definers 160, 161, 163 held in the definer housing portions 145, 146, 148 and the outer surface of the unit body 141 facing the outside to communicate with each other such that the fluid 170 flows therebetween. That is, one end portion of each of the second definer communication paths 154, 155, 156 is opened to a corresponding one of the definer housing portions 145, 146, 148, and the other end portion is opened at the unit-side coupling portion 142. In this case, the three second definer communication paths 154, 155, 156 are formed next to each other along the longitudinal direction of the unit body 141.

The second definer communication path 154 described herein is a path connected to the second externally-communicable path 114 and causing the fluid 170 to flow between the second externally-communicable path 114 and the turning characteristic definer 160. The second definer communication path 155 is a path connected to the second externally-communicable path 115 and causing the fluid 170 to flow between the second externally-communicable path 115 and the turning characteristic definer 161. The second definer communication path 156 is a path connected to the second externally-communicable path 116 and causing the fluid 170 to flow between the second externally-communicable path 116 and the turning characteristic definer 163.

The turning characteristic definers 160, 161, 162, 163 are tools defining the turning characteristics of the rotor 130 by means of the fluid 170. These turning characteristic definers 160, 161, 162, 163 are respectively housed in the definer housing portions 145, 146, 147, 148. Specifically, the turning characteristic definer 160 includes a one-way valve causing the fluid 170 to flow only from one side to the other side. In the present embodiment, the turning characteristic definer 160 is housed in the definer housing portion 145, and causes the fluid 170 to flow only from a first definer communication path 150 side to a second definer communication path 154 side.

The turning characteristic definer 161 includes a relief valve releasing a pressure in the cell R2 to the cell R1 when the pressure in the cell R2 in the inner chamber 103 has reached a predetermined value or greater, to hold the pressure in the cell R2 at the predetermined value or less. In the present embodiment, the turning characteristic definer 161 is housed in the definer housing portion 146, and defines the maximum pressure in the cell R2 through each of the second definer communication path 155 and the first definer communication path 151.

The turning characteristic definer 162 includes an accumulator compensating for a volume change in the fluid 170 due to expansion or contraction caused by a temperature change in the fluid 170 in the inner chamber 103. In the present embodiment, the turning characteristic definer 162 is housed in the definer housing portion 147. The turning characteristic definer 162 communicates with the cell R1 through the first definer communication path 152, and compensates for a pressure change in the fluid 170 in the inner chamber 103.

The turning characteristic definer 163 includes a linear solenoid valve capable of variably controlling the flow rate of the fluid 170. In the present embodiment, the turning characteristic definer 163 is housed in the definer housing portion 148, and variably controls the flow rate of the fluid 170 between the first definer communication path 153 and the second definer communication path 156. In this case, actuation of the linear solenoid valve forming the turning characteristic definer 163 is controlled by a control device provided at the attachment target for the rotary damper 100.

The fluid 170 is a substance providing resistance to the movable vane 132 turning in the inner chamber 103 such that a damper function of the rotary damper 100 acts. The inside of the inner chamber 103 is filled with the fluid 170. The fluid 170 includes a liquid, gel, or semisolid substance having a viscosity according to the specifications of the rotary damper 100 and having fluidity. In this case, the viscosity of the fluid 170 is selected as necessary according to the specifications of the rotary damper 100. In the present embodiment, the fluid 170 includes oil such as mineral oil or silicone oil. Note that the fluid 170 is indicated by a hatched portion in a dashed circle only in FIGS. 5 and 9.

(Actuation of Rotary Damper 100)

Next, actuation of the rotary damper 100 configured as described above will be described. The rotary damper 100 is attached to the hinge-side portion of the door (not shown), and generates the damping force when the flat plate-shaped door is closed.

Figure 11:
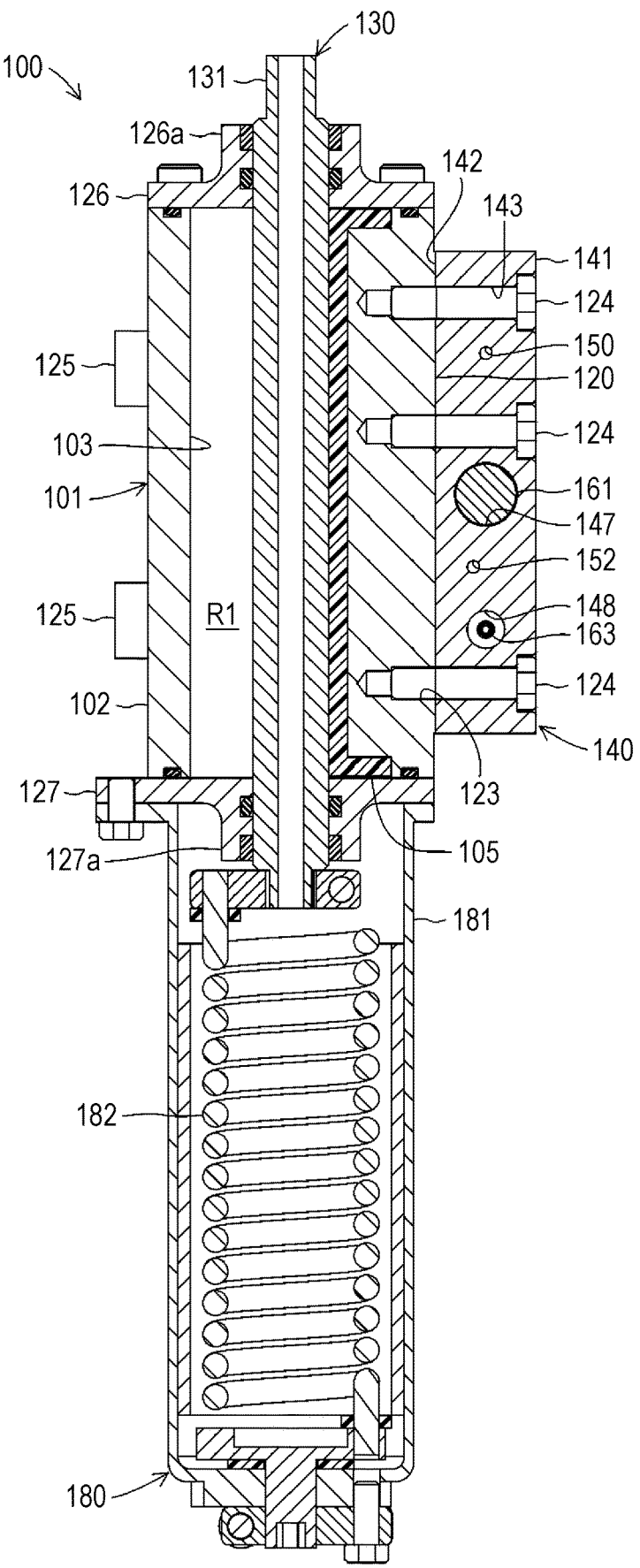
FIG. 11 is a sectional view showing a state in which the rotary damper shown in FIG. 1 is coupled to a torsion spring unit.
Figure 12:
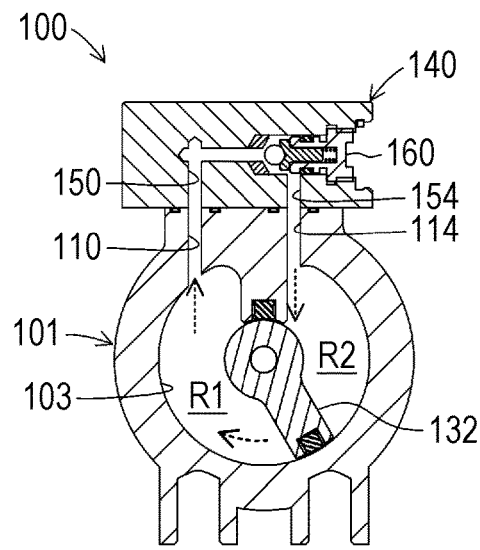
FIGS. 12(A) to 12(D) are sectional views showing an actuation state in which a rotor of the rotary damper shown in FIGS. 5 to 8 turns clockwise as viewed in the figure.
Figure 12:
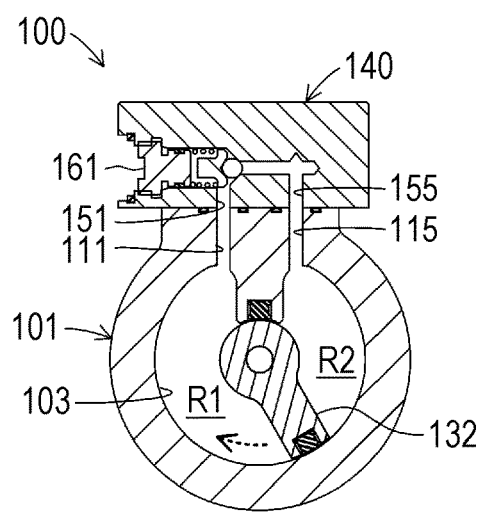
Figure 12:
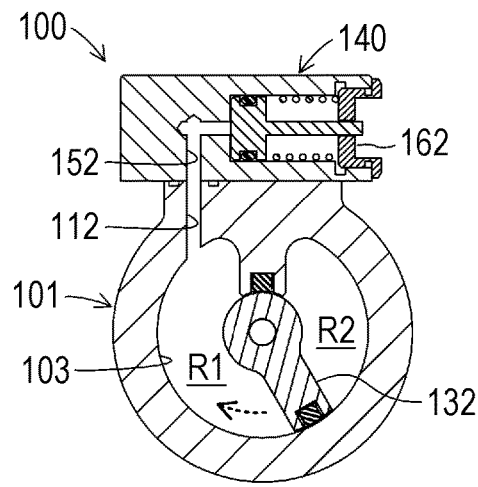
Figure 12:
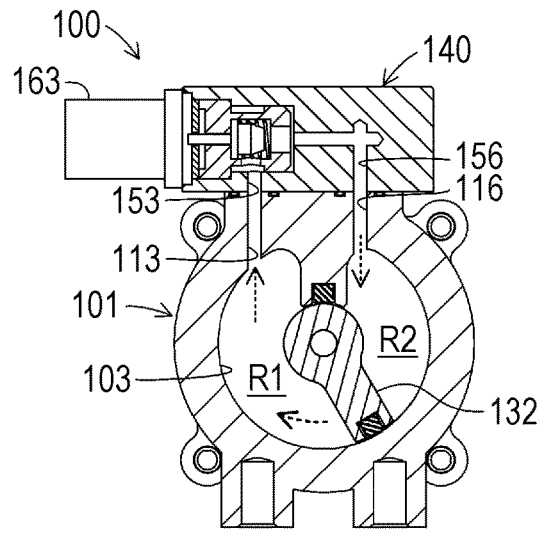
Figure 13:
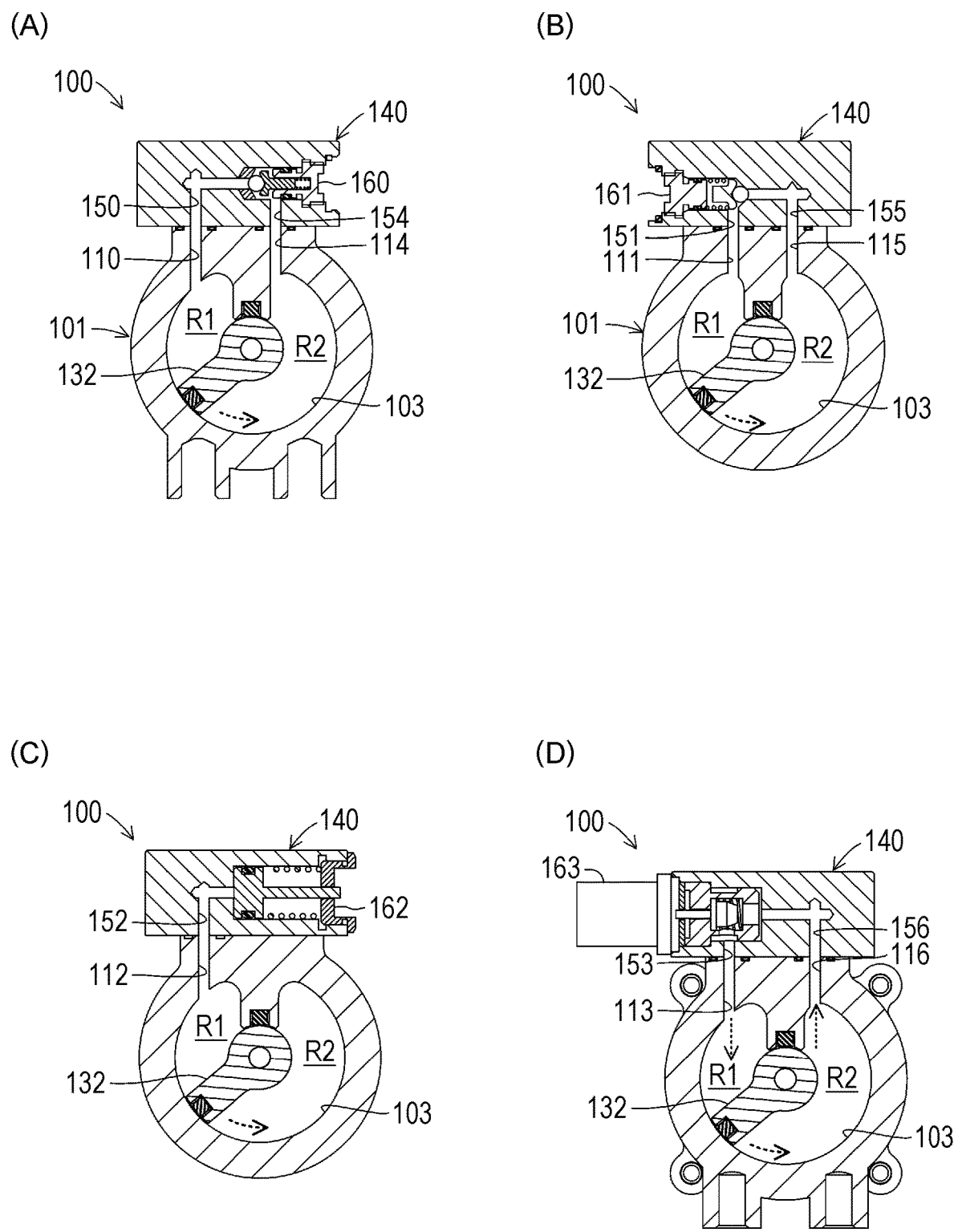
FIGS. 13(A) to 13(D) are sectional views showing an actuation state in which the rotor of the rotary damper shown in FIGS. 5 to 8 turns counterclockwise as viewed in the figure.

Specifically, in the rotary damper 100, a torsion spring unit 180 is coupled to one (the lower side as viewed in the figure) end portion of the shaft 131 of the rotor 130, as shown in FIG. 11. The torsion spring unit 180 is a tool for generating rotation force for closing the door. The torsion spring unit 180 includes, in a bottomed cylindrical housing 181, a coil spring-shaped torsion spring 182 generating torsional torque. The rotary damper 100 is, at the other (the upper side as viewed in the figure) end portion of the shaft 131 of the rotor 130, attached to the hinge-side portion of the door (not shown), and therefore, functions as the door closer. Moreover, the rotary damper 100 is connected to a not-shown automatic door unit.

The automatic door unit is a mechanical device eliminating force provided to the door when a person having entered a room or a person having left the room has been sensed or when the door is opened after the force has been provided to the door. The automatic door unit is electrically connected to the turning characteristic definer 163 (the linear solenoid valve) of the rotary damper 100, and controls actuation of the turning characteristic definer 163.

In the rotary damper 100, the rotor 130 turns clockwise as viewed in the figure (see a thick dashed arrow) when the door is opened, as shown in FIGS. 12(A) to 12(D). That is, in the rotary damper 100, the movable vane 132 turns clockwise toward the left surface of the fixed vane 104, as viewed in the figure.

In this case, the cell R1 is, by the turning characteristic definer 160 (the one-way valve), in a state in which the fluid 170 "can flow out" to the cell R2, and by the turning characteristic definer 163 (the linear solenoid valve), is in a state in which the fluid 170 "can flow out without being throttled." Thus, the fluid 170 in the cell R1 flows into the cell R2 through each of the first externally-communicable path 110, the first definer communication path 150, the turning characteristic definer 160, the second definer communication path 154, and the second externally-communicable path 114 (see dashed arrows) as the volume of the cell R1 decreases by clockwise turning of the movable vane 132 as viewed in the figure.

At the same time, the fluid 170 in the cell R1 flows into the cell R2 through each of the first externally-communicable path 113, the first definer communication path 153, the turning characteristic definer 163, the second definer communication path 156, and the second externally-communicable path 116 (see dashed arrows) as the volume of the cell R1 decreases by clockwise turning of the movable vane 132 as viewed in the figure. In these cases, no damping force is generated in the rotary damper 100.

On the other hand, in the rotary damper 100, the rotor 130 turns counterclockwise as viewed in the figure (see a thick dashed arrow) when the door is closed (the force provided to the door is eliminated), as shown in FIGS. 13(A) to 13(D). That is, in the rotary damper 100, the movable vane 132 turns counterclockwise toward the right surface of the fixed vane 104, as viewed in the figure (see the dashed arrow).

In this case, the cell R2 is, by the turning characteristic definer 160 (the one-way valve), in a state in which the fluid 170 "cannot flow out" to the cell R1, and by the turning characteristic definer 163 (the linear solenoid valve), is in a state in which the fluid 170 "can flow out with being throttled." Thus, the fluid 170 in the cell R2 flows into the cell R1 through each of the second externally-communicable path 116, the second definer communication path 156, the turning characteristic definer 163, the first definer communication path 153, and the first externally-communicable path 113 as the volume of the cell R2R1 decreases by counterclockwise turning of the movable vane 132 as viewed in the figure. In this case, in the rotary damper 100, the flow of fluid 170 having flowed out of the cell R2 is blocked by the turning characteristic definer 163. Thus, the pressure in the cell R2 increases, and rotation resistance as the damping force is generated on the rotor 130.

In a case where the pressure in the cell R2 in the inner chamber 103 has increased due to a high rotation speed of the rotor 130 in turning of the rotor 130 as described above, the turning characteristic definer 161 (the relief valve) is actuated.

Specifically, in a case where the pressure in the cell R2 has increased in turning of the rotor 130, the turning characteristic definer 161 (the relief valve) is opened, and accordingly, the pressure in the cell R2 is released to the cell R1 by way of the second externally-communicable path 115, the second definer communication path 155, the turning characteristic definer 161, the first definer communication path 151, and the first externally-communicable path 111.

In a case where the volume of the fluid 170 has increased or decreased due to the temperature change in the fluid 170, the turning characteristic definer 162 (the accumulator) absorbs such a volume increase/decrease in such a manner that the fluid 170 in the cell R1 flows into or flows out of a cylinder forming the turning characteristic definer 162 through the first externally-communicable path 112 and the first definer communication path 152.

A user of the rotary damper 100 can instruct the automatic door unit connected to the turning characteristic definer 163 (the linear solenoid valve) of the rotary damper 100 to change the flow rate of the fluid 170 (the degree of opening of the valve) in the turning characteristic definer 163 (the linear solenoid valve). Accordingly, the user can change the damping force of the rotary damper 100.

Next, the user of the rotary damper 100 detaches the turning characteristic defining unit 140 from the housing 101 so that maintenance of the rotary damper 100 can be performed or the specifications of the rotary damper 100 can be changed. Specifically, the user loosens the bolts 124, so that the turning characteristic defining unit 140 can be detached from the housing body 102. Accordingly, the user can perform maintenance for the housing 101 and the turning characteristic defining unit 140. In the case of changing the specifications of the rotary damper 100, the user prepares a turning characteristic defining unit 140 including at least one turning characteristic definer having different specifications as at least one of turning characteristic definers 160, 161, 162, 163.

Then, the user fastens and attaches, to the housing body 102 with the bolts 124, the turning characteristic defining unit 140 for which maintenance has been performed, a new turning characteristic defining unit 140 having the same specifications, or the turning characteristic defining unit 140 having the different specifications. In this manner, maintenance of the rotary damper 100 can be performed, or the specifications of the rotary damper 100 can be changed.

As can be understood from description of the actuation method above, according to the above-described embodiment, in the rotary damper 100, the first definer communication paths 150, 151, 152, 153 and the second definer communication paths 154, 155, 156 in the turning characteristic defining unit 140 including the turning characteristic definers 160, 161, 162, 163, respectively, are detachably connected to the first externally-communicable paths 110, 111, 112, 113 and the second externally-communicable paths 114, 115, 116 connected to the inner chamber 103 in the housing 101. Thus, the turning characteristic specifications can be easily changed by replacement with a turning characteristic defining unit 140 having a desired turning characteristic definer. Further, a typical component of the rotary damper 100, such as the housing 101, can be continuously used, leading to favorable economic performance. Moreover, in the rotary damper 100, the turning characteristic definers 160, 161, 162, 163 having such sizes that the turning characteristic definers 160, 161, 162, 163 cannot be provided in the housing 101 can be easily provided.

Implementation of the present invention is not limited to that in the above-described embodiment, and various changes can be made without departing from the object of the present invention. Note that in description of each variation, the same reference numerals are used to represent elements similar to those of the above-described embodiment and overlapping description thereof will be omitted.

For example, in the above-described embodiment, the turning characteristic defining unit 140 includes the four turning characteristic definers 160, 161, 162, 163. However, the turning characteristic defining unit 140 may only be required to be selected such that required characteristics are achieved according to the specifications of the target to which the rotary damper 100 is to be attached.

That is, the turning characteristic defining unit 140 may only be required to include at least one turning characteristic definer defining turning of the rotor 130. Thus, for example, the turning characteristic defining unit 140 may be configured without the turning characteristic definer 162 (the accumulator) in the case of not requiring temperature compensation for the fluid 170. In the case of not requiring precise damping force control, various throttle valves such as an orifice and a ganged valve can be used in the turning characteristic defining unit 140 instead of the linear solenoid valve.

In the rotary damper 100, the second externally-communicable paths 114, 115, 116 and the second definer communication paths 154, 155, 156 are not necessary in the case of providing only a turning characteristic definer which does not need to communicate with the cell R1 and the cell R2 at the same time, such as the case of providing only the turning characteristic definer 162 (the accumulator). Note that in this case, in the rotary damper 100, a throttle valve(s) such as an orifice or a ganged valve needs to be provided at the fixed vane 104 and/or the movable vane 132 to ensure the flow of fluid 170 between the cell R1 and the cell R2.

The turning characteristic definer may be housed and held inside without projecting to the outside of the unit body 141, as in the turning characteristic definers 160, 161. Alternatively, the turning characteristic definer may be held with part of the turning characteristic definer projecting from the outer surface of the unit body 141, as in the turning characteristic definers 162, 163.

In the above-described embodiment, each of the first externally-communicable paths 110 to 113, the second externally-communicable paths 114 to 116, the first definer communication paths 150 to 153, and the second definer communication paths 154 to 156 is provided for a corresponding one of the turning characteristic definers 160 to 163. However, the first externally-communicable paths 110 to 113, the second externally-communicable paths 114 to 116, the first definer communication paths 150 to 153, and the second definer communication paths 154 to 156 can be shared by a certain turning characteristic definer. For example, for the turning characteristic definer 162 (the accumulator), the first externally-communicable path 112 and the first definer communication path 152 may be omitted, and a path branched from at least one of the first definer communication paths 150, 151, 153 may be provided. Thus, at least one of the first definer communication paths 150, 151, 153 can be shared.

In the above-described embodiment, the turning characteristic definers 160, 161, 162, 163 define the direction of turning of the rotor 130, torque damping characteristics, characteristics of compensation for the volume change in the fluid 170 due to the temperature change in the fluid 170, characteristics of permissibility of turning of the rotor 130 itself, and the like. In this case, in the turning characteristic definer 163 in the above-described embodiment, the valve is fully opened or closed, so that the state of allowing the flow of fluid 170 and the state of blocking the flow of fluid 170 can be selectively controlled. However, the turning characteristic definer may define characteristics other than the direction of turning of the rotor 130, the torque damping characteristics, the characteristics of compensation for the volume change in the fluid 170 due to the temperature change in the fluid 170, and the characteristics of the permissibility of turning of the rotor 130 itself, needless to say.

In the above-described embodiment, the turning characteristic definers 160, 161, 162, 163 are, in the unit body 141, arranged next to each other in the axis direction of the inner chamber 103 in the housing 101. However, the turning characteristic definers 160, 161, 162, 163 may be, in the unit body 141, arranged next to each other in a direction other than the axis direction of the inner chamber 103 in the housing 101, such as a direction perpendicular to such an axis direction.

Figure 14:
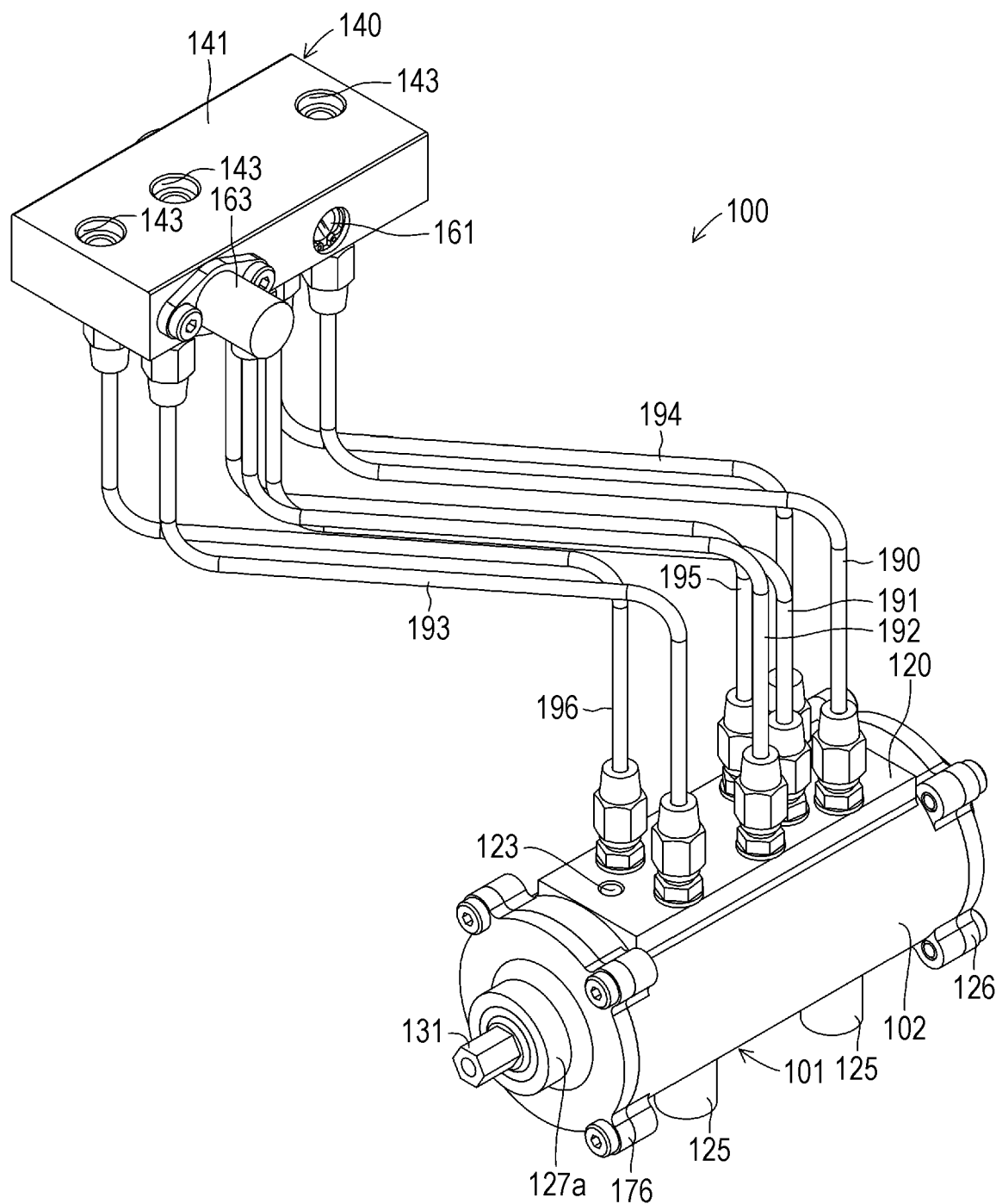
FIG. 14 is a perspective view schematically showing an entire configuration of a rotary damper according to a variation of the present invention.

In the above-described embodiment, the rotary damper 100 is configured such that the turning characteristic defining unit 140 is directly attached to the housing 101. However, in the rotary damper 100, the turning characteristic defining unit 140 may be provided at a position physically apart from the housing 101 and may be coupled to the housing 101, as shown in FIG. 14. In this case, in the rotary damper 100, the first externally-communicable paths 110 to 113 and the second externally-communicable paths 114 to 116 on a housing 101 side and the first definer communication paths 150 to 153 and the second definer communication paths 154 to 156 on a turning characteristic defining unit 140 side are detachably attached to each other through first-side pipes 190, 191, 192, 193 and second-side pipes 194, 195, 196 formed in a tubular shape.

In this case, the first-side pipes 190, 191, 192, 193 and the second-side pipes 194, 195, 196 may be formed as rigid bodies, which are not freely bendable and have rigidity, from a metal material or a resin material, or may be formed as tubes, which are freely bendable and have flexibility, from a resin material. With this configuration, the housing 101 can be, in the rotary damper 100, placed in a narrow space, or the housing 101 or the turning characteristic defining unit 140 can be placed at a location where maintenance can be easily performed. Thus, variations in installation of the rotary damper 100 can be increased.

In the above-described embodiment, each of the housing-side coupling portion 120 and the unit-side coupling portion 142 is formed in the flat planar shape. However, each of the housing-side coupling portion 120 and the unit-side coupling portion 142 may be formed in a shape other than the flat planar shape, such as raised and recessed shapes fitted to each other.

In the above-described embodiment, in the rotary damper 100, the two cells R1, R2 are formed in the inner chamber 103. However, in the rotary damper 100, the inner chamber 103 may only be required to be divided into at least two or more cells, and three or more cells may be formed. That is, in the rotary damper 100, two or more movable vanes 132 and two or more fixed vanes 104 may be provided to form three or more cells in the inner chamber 103.

In the above-described embodiment, the case of using the rotary damper 100 as the door closer attached to the hinge portion of the door has been described. However, the rotary damper 100 is also used at a location other than the door closer, needless to say. For example, the rotary damper 100 may be attached to a base end portion of a swing arm supporting a rear wheel of a two-wheeled self-propelled vehicle (a motorcycle) such that the rear wheel is movable up and down, and may be used as a damping device damping kinetic energy in up-down movement of the rear wheel.

The rotary damper 100 may be used with attached to a location (e.g., a seat opening/closing mechanism) at the two-wheeled self-propelled vehicle other than the swing arm, a vehicle (a suspension mechanism, a seat mechanism, or an opening/closing door at a four-wheeled self-propelled vehicle) other than the two-wheeled self-propelled vehicle, or a mechanical device, an electric device, a tool, or furniture other than the self-propelled vehicle.

LIST OF REFERENCE SIGNS

R1, R2 Cell
100 Rotary Damper
101 Housing
102 Housing Body
103 Inner Chamber
104 Fixed Vane
105 Seal Body
110, 111, 112, 113 First Externally-Communicable Path
114, 115, 116 Second Externally-Communicable Path
120 Housing-Side Coupling Portion
121 Ring-Shaped Recessed Portion
122 Seal Member
123 Attachment Hole
124 Bolt
125 Fixing Portion
126, 127 Lid
126a, 127a Rotor Support Portion
130 Rotor
131 Shaft
132 Movable Vane
133 Seal Body
140 Turning Characteristic Defining Unit
141 Unit Body
142 Unit-Side Coupling Portion
143 Attachment Hole
145, 146, 147, 148 Definer Housing Portion
150, 151, 152, 153 First Definer Communication Path
154, 155, 156 Second Definer Communication Path
160, 161, 162, 163 Turning Characteristic Definer
170 Fluid
180 Torsion Spring Unit
181 Housing
182 Torsion Spring
190, 191, 192, 193 First-Side Pipe
194, 195, 196 Second-Side Pipe

What is claimed is:

1. A rotary damper comprising:
a housing having a cylindrical inner chamber housing fluid in a liquid-tight manner and having a fixed vane formed in a wall shape along a radial direction in the inner chamber and blocking a flow of the fluid in a circumferential direction;
a rotor having, at an outer peripheral portion of a shaft, a movable vane dividing an inside of the inner chamber and turning while pressing the fluid to a fixed vane side;
at least two cells formed by the fixed vane and the movable vane in the inner chamber and having volumes increasing or decreasing according to a rotation direction of the movable vane;

multiple types of turning characteristic definers defining and changing different types of turning characteristics of the rotor by use of the fluid; and a turning characteristic defining unit provided outside the housing and having the multiple types of turning characteristic definers and a multiple first definer communication paths each causing the fluid to flow to or from a corresponding one of the multiple types of turning characteristic definers, wherein the housing has a multiple first externally-communicable paths each extending from at least one of the at least two cells and opened at an outer surface of the housing such that the fluid flows in the first externally-communicable path, and in the turning characteristic defining unit, each of the multiple first definer communication paths is detachably connected to a corresponding one of the multiple first externally-communicable paths.

2. The rotary damper according to claim 1, wherein the turning characteristic defining unit is detachable from the housing.

3. The rotary damper according to claim 2, wherein the housing has a housing-side coupling portion formed in a flat planar shape at part of the outer surface, and the multiple first externally-communicable paths are opened at the housing-side coupling portion, and the turning characteristic defining unit has a unit-side coupling portion formed in a flat planar shape at part of an outer surface and arranged facing the housing-side coupling portion, and the multiple first definer communication paths are opened at the unit-side coupling portion.

4. The rotary damper according to claim 1, wherein the turning characteristic defining unit is provided at a position physically apart from the housing.

5. The rotary damper according to claim 1, wherein the housing has a second externally-communicable path extending from another one of the at least two cells and opened at the outer surface of the housing such that the fluid flows in the second externally-communicable path, and the turning characteristic defining unit has a second definer communication path causing the fluid to flow to or from one of the multiple types of turning characteristic definers, and the second definer communication path is detachably connected to the second externally-communicable path.

6. The rotary damper according to claim 1, wherein in the turning characteristic defining unit, the multiple types of turning characteristic definers are provided along an axis direction of the inner chamber.

7. The rotary damper according to claim 1, wherein in the turning characteristic defining unit, the multiple types of turning characteristic definers are provided in a direction orthogonal to an axis of the inner chamber and at intervals along the axis of the inner chamber.

8. The rotary damper according to claim 1, wherein the at least two cells include a first cell and a second cell, and the multiple types of turning characteristic definers include at least different two of:
- a turning characteristic definer including a one-way valve causing the fluid to flow only from the first cell to the second cell;
- a turning characteristic definer including a relief valve releasing a pressure in the second cell to the first cell when the pressure in the second cell has reached a predetermined value or greater;
- a turning characteristic definer including an accumulator compensating for a volume change in the fluid due to expansion or contraction caused by a temperature change in the fluid in the inner chamber; and
- a turning characteristic definer including a linear solenoid valve capable of variably controlling a flow rate of the fluid.

* * * * *